United States Patent [19]

Vinciguerra

[11] 4,265,427

[45] May 5, 1981

[54] SPHERICAL SEALTIGHT VALVE FOR FLUIDS

[75] Inventor: Costantino Vinciguerra, Florence, Italy

[73] Assignee: Nuovo Pignone, S.p.A., Florence, Italy

[21] Appl. No.: 52,795

[22] Filed: Jun. 28, 1979

[30] Foreign Application Priority Data

Jul. 5, 1978 [IT] Italy .............................. 25352 A/78

[51] Int. Cl.³ ........................................ F16K 5/00
[52] U.S. Cl. .................................... 251/315; 251/367
[58] Field of Search .............................. 251/315, 367

[56] References Cited

U.S. PATENT DOCUMENTS

| 3,006,602 | 10/1961 | Usab | 251/315 |
|---|---|---|---|
| 3,323,537 | 6/1967 | Shafer | 251/315 |
| 3,339,887 | 9/1967 | Hutchens | 251/315 |
| 3,460,802 | 8/1969 | Colby et al. | 251/315 |
| 3,508,736 | 4/1970 | Rhodes et al. | 251/315 |
| 3,678,556 | 7/1972 | Shafer | 251/315 |
| 3,794,291 | 2/1974 | Suyama | 251/315 |
| 3,841,601 | 10/1974 | Grove et al. | 251/315 |
| 3,883,112 | 5/1975 | Milleville et al. | 251/315 |

*Primary Examiner*—William R. Cline
*Assistant Examiner*—H. Jay Spiegel
*Attorney, Agent, or Firm*—Morgan, Finnegan, Pine, Foley & Lee

[57] ABSTRACT

A valve body for a spherical-shutter valve for gases or fluids is disclosed, said body consisting of two hemispherical hoods enclosing the shutter and to be welded along their great circle, two couples of half-rings being welded in symmetrical positions relative to the sphere equator to provide sealing action: an annular channel is furthermore provided in the meridian direction immediately beneath the welding seam line to prevent welding material from entering the valve interior and to house a photographic film to take nondestructive control pictures.

2 Claims, 3 Drawing Figures

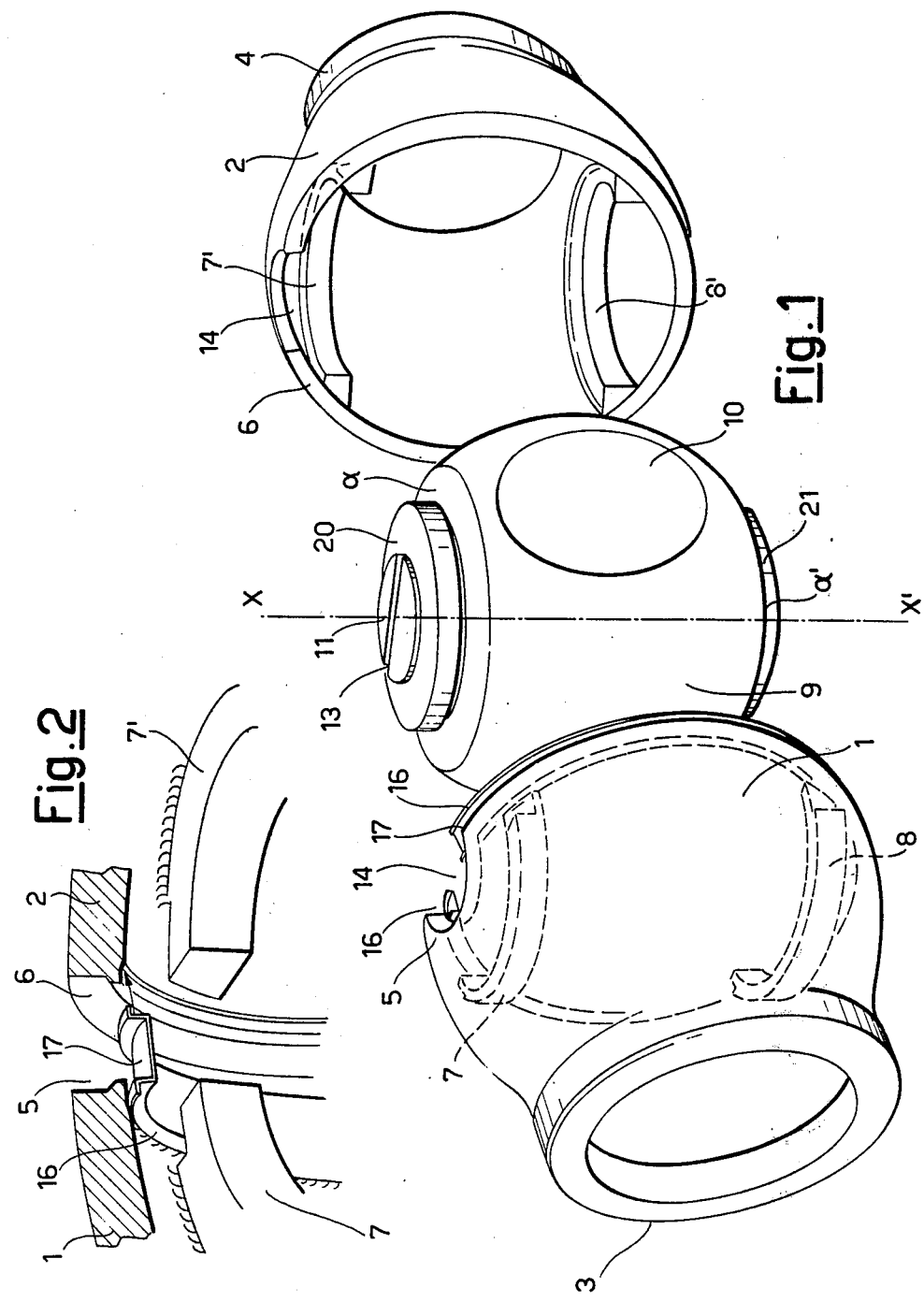

SPHERICAL SEALTIGHT VALVE FOR FLUIDS

This invention relates to a spherical valve having a welded outer body and which is adapted to cut off fluid or gas streams on pipelines or gas-lines having large diameters, and, more particularly, it relates to improvements in such types of valves, by virtue of which the two pieces which compose the valve body are welded along this circumferential line which is perpendicular to the pipe axis and is contained on a plane passing through the center of the sphere so that the welding seam, inasmuch as it does not meet any hindrance on its path, can conveniently be provided automatically and can be easily removed with a lathe tool so as to make it possible to effect a simple overhauling for repair, checking or cleaning operations and a subsequent welding anew without any further machining steps.

As is known, the most common spherical cutoff valves are of the dismemberable type by bolted flanges on the outer body.

That is to say that they are generally composed by a central cylindrical body coaxial with the pipeline and at the outlet end of which there are flanged two end hoods terminated by cylindrical ducts which are connected, in turn, to the pipe in which the valve is to be inserted, by welding or by bolting.

In the interior of the valve body there is enclosed a spherical shutter member having a cylindrical bore formed therethrough and having the same diameter as that of the pipeline, said shutter being supported for rotation by the central cylindrical body with the aid of two rotation pins having a vertical axis and integral with the shutter which emerge from the valve body and on which the thrust impressed by the fluid is discharged when the valve is shut, that is, when the shutter has been so rotated that its cylindrical bore is oriented perpendicularly to the pipeline axis. The two end hoods, lastly, house, each, a floating ring which, urged by spring assemblies against the spherical shutter member, acts like a sealing gasket and thus provides a tight seal between the ring and the cylindrical conduits.

These kinds of valves of the prior art have the defect that the rotation pivot of the spherical shutter, as they emerge from the valve body and thus exert a lever effect onto the outer valve body under the thrust of the cutoff gas stream, are prone to deformation and tend to stress the valve body considerably.

However, these valves have the outstanding advantage that they can easily be dismembered for repair, check and cleaning operations so that a valve of this kind can be used again and again once it has been fixed.

At present, however, the demand by the users of improved sealtightness guarantees for such valves has caused a considerable development of spherical valves the outer body of which is welded rather than flanged. This new embodiment has required the solution of the problem of welding together the two pieces composing the valve body without damaging by the welding heat the sealing gaskets and more particularly the pin gaskets.

The prior art has disclosed a number of spherical valves having a welded outer valve body. According to one of the conventionally known types (CAMERON valve) the problem has been solved by providing the valve body in the form of two pieces which are symmetrical relative to the horizontal middle plane of the cylindrical conduits, the welding being then carried out along said plane.

By so doing, the gaskets for the pins are not affected by the welding heat, contrary to what would conversely occur for the gaskets between the cylindrical conduits and the shutter. The latter drawback, however, is off-set by installing the latter gaskets subsequently with the aid of two further welding steps in correspondence with the ends of the cylindrical conduits.

Summing up, in this prior art embodiment three discrete welding steps are required.

According to another conventional embodiment of welded body spherical valve (ARGUS valve) the problem in question is solved by a single welding operation by providing the valve body into two pieces which are symmetrical relative to a plane which is sloping relative to the vertical line and is passed equally spaced apart from the pin gaskets and the gaskets between the cylindrical conduits and the spherical shutter. Also in this case, however, the welding operation is carried out along an elliptical line and this latter, of course, has a length longer than the circumferential line which would have been obtained if the welding operation were effected along the line which conjoins the shutter pins and which is the shortest path.

Lastly, according to a third conventional approach of welded body spherical valve, the welding operation is carried out along the plane which is perpendicular to the pipeline axis and passes through the sphere center, but these valves have the rotation pins emerging from the valve body so that the pins interfere with the main welding seamline and make the welding operation cumbersome and it becomes practically impossible to unweld the valve.

On the other hand, it must be borne in mind that in all the known types of welded-body valves the short-coming of the deformation of the pins due to the thrust of the cutoff fluid or gas is still present, and this drawback is most serious since, for economical reasons, these kinds of valves are not recommended for being disassembled and fixed to be used once again. Summing up, the welded-body spherical valves known heretofore do not provide for an economically acceptable overhauling for checking and cleaning and less than all for repair, so that, once they have been found to be defective, they must merely be replaced by other new valves. This is due to the fact that the two pieces the valve body is made of must be welded together along lines which are neither circumferential nor perpendicular to the piping axis, or because said pieces are welded along circumferential lines contained on a plane passing through the center of the spherical shutter but which, however, intersect the two pins projecting from the valve body and about which the spherical shutter can be rotated, said pins bearing the thrust of the gas on the shutter: thus, the unwelding cannot be made on a lathe and economically, but must be made manually, that which implies waste of time. In addition, the presence of the deformed pins is not such as to make it possible to weld the two pieces of the valve body together once again without cumbersome and expensive repair operations on said pins.

On the basis of the foregoing, it will be understood how important would it be to have a welded-body spherical valve available, which is capable of being overhauled in an economically acceptable way both by the manufacturer who is thus enabled to correct with a small expenditure a possibly defective valve during construction and to reduce the scraps drastically, and by the user who can reuse a valve once that the checking, cleaning and possible repair operations have been completed, the service life of the valve being thus considerably extended.

An object of the present invention is to solve the problem outlined above by offsetting all the short-comings of the conventional valves, by providing a spherical valve having a welded outer valve body, the welding seam running along the shortest-path circumferential line, such valve being economically dismemberable for maintenance purpose and thus reusable.

This object is achieved, in the main, by virtue of the fact that the thrust of the fluid concerned on the shut valve is no longer discharged onto pins which emerge from the valve body, but, rather, is caused to be received by couples of half-rings which are welded in the interior of the two pieces which make up the valve body, in such a way that, as the two pieces are welded together, the two couples of half-rings match edgewise and make up two complete guiding and thrust-bearing rings for a spherical shutter inserted therebetween by means of two appropriate circular projections formed on the diametrical ends of said spherical shutter.

By so doing, in fact, by virtue of the fact that the pin gaskets have been dispensed with, it has become possible to weld together the two pieces, which compose the valve body, along the circumferential line corresponding to the shortest path. In addition, since the pins have been suppressed as thrust-bearing members, the hazard of any deformation thereof has been done away with so that, in sum, all the reasons which rendered economically unadvisable the overhauling of a welded-body spherical valve for maintenance and reuse, have been suppressed.

On the other hand, to use as rotation-guiding members and thrust-bearing members for the spherical shutter the two couples of half-rings which are pairwise placed in butt-end relationship makes the overhauling of such a valve extremely easy inasmuch as the mere unwelding on the lathe of the two pieces of the valve body is all which is required.

Generally speaking, the welded-body spherical valve according to the present invention is characterized in that it has a valve body composed by two hemispherical hoods equipped with cylindrical and outlet ports, said hoods being welded together along the shortest-path circumferential line, there being welded, in the interior of each hood and equally spaced apart from the valve axis, two half-rings oriented along said axis so that, as the two hoods are welded together, the half-rings of either hood abut edgewise the corresponding half-rings of the other hood to provide thereby two annular guiding and thrust-bearing housings for a spherical shutter which is inserted therebetween with two appropriate circular projections formed at the diametrical ends of said shutter and contained within the surface of the sphere.

Then, according to another feature of the invention, in the vicinity of the edge to be welded of either hemispherical hood forming the valve body and in the interior of such hood, an annular strip in the shape substantially of a U is welded and caused to project out of said edge.

By this provision, as the two hemispherical hoods are brought to abut one another prior to being welded, said strip is placed beneath the welding area and thus becomes a shielding member preventing any welding material from entering the interior of the valve.

On the other hand, the groove provided by said strip can be used as a guiding race for inserting in the valve an X-ray film to radiograph the as effected welding seam.

The invention is now better explained with reference to the accompanying drawing which illustrate a preferred practical embodiment given as a nonlimiting example since technical and constructional modifications and changes are always possible without departing from the scope of this invention.

In the drawings:

FIG. 1 shows an exploded perspective view of the valve according to the invention.

FIG. 2 is a fragmentary exploded and enlarged perspective view of the U-shaped annular strip in the valve according to the invention.

Figure 3:
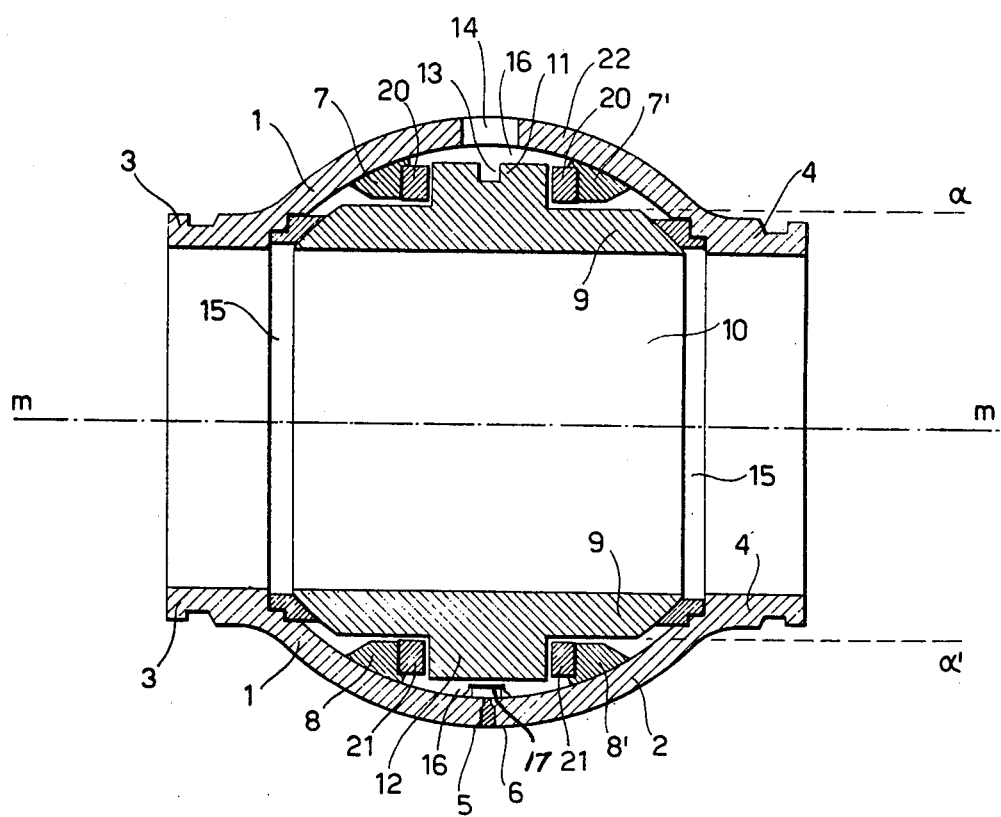
FIG. 3 is a front view in cross-section and on an enlarged scale of the valve according to this invention.

Having now reference to the drawings, the numerals 1 and 2 indicate, respectively, the two hemispherical hoods, which, equipped with the respective cylindrical inlet and outlet ports 3 and 4, must be welded together in correspondence with their peripheral edges, 5 and 6, respectively, to make up the valve body, said edges being just the shortest-path circumferential line. In the interior of each individual hood (1 and 2) there are welded equally spaced apart from the axis m—m of the valve, and oriented therealong, two half-ring couples, 7, 8 and 7', 8', respectively. These half-rings are welded with their concave faces in confronting relationship and in such a way that, as the two hoods 1 and 2 are welded together, the half-rings 7 and 8 of the hood 1 match the respective corresponding half-rings 7' and 8' of the hood 2, thus providing two annular housings.

The spherical shutter 9, which has a channel 10, is then turned in correspondence with its diametrical ends perpendicular to the valve axis m—m so as to provide two circular projections, 11 and 12, respectively, which, equipped with internal rings 20 and 21 intended to act as rolling bearings, become inserted into the two annular housing aforementioned, as formed by the half-rings 7–7' and 8–8' which thus are guiding and thrust-bearing members to control the rotation of the shutter 9.

The basic feature of the circular projections 11 and 12 lies in that they are formed so as not to project out of the spherical surface but they are contained in the interior of such a surface by virtue of the fact that the portion of the sphere beyond the planes alpha and alpha' (best seen in FIG. 3) can be exploited to form pivot-like members inasmuch as that portion has no part in the formation of the tight seal by the floating rings 15 during the rotation about the axis X–X'.

The rotation of the shutter is carried out by an external actuator which is caused to act upon a notch 13 (see FIG. 1) provided on the shutter, the actuator shaft being caused to pass through an appropriate bore 14 formed through the walls of the hoods 1 and 2.

In FIG. 3, the numeral 15 indicates the floating rings which carry, as insets, the seaming gaskets between the shutter 9 and the cylindrical conduits 3 and 4.

Lastly, in the vicinity of the edge 5 (best seen in FIG. 2) of the hood 1 and in the interior of the latter a U-shaped annular strip 16 is welded. The strip 16 is welded in such a way as to project out of the edge 5 and have its channel 17 confronting the wall of the hood 1: thus, when the two hoods 1 and 2 will be brought together to be welded, the strip 16 will be situated just beneath the welding area and its channel 17 will provide, with the hood walls, an enclosure which will prevent any welding material from falling in the valve interior and will also be exploitable for inserting a photographic film therein so as to obtain a radiograph of the completed welding seam.

I claim:

1. A spherical valve having a welded outer body comprising a valve body composed by two pieces welded together and equipped with inlet and outlet cylindrical conduits, a spherical shutter equipped with a channel and rotatable about an axis of rotation perpendicular to the valve axis, and with floating rings with sealing gaskets between said shutter and said cylindrical conduits, characterized in that said two pieces which compose the valve body are two hemispherical hoods which are welded together along a shortest-path circumferentially line and within each hood are welded, equally spaced apart from the valve axis, two half-rings having their concave forces oriented along the valve axis and in such a way that, as the two hoods are welded together, the half-rings of either hood abut edgewise the corresponding half-rings of the confronting hood so as to provide two annular housings for guiding and for bearing the thrust of the spherical shutter inserted therebetween by two specially provided circular projections formed thereon at the diametrical ends thereof in correspondence with the axis of rotation of said shutter, said projections being contained within the peripheral surface of the spherical shutter.

2. A valve according to claim 1, characterized in that in the vicinity of the edge to be welded of either hemispherical hood of the valve body and in its interior a substantially U-shaped annular strip is welded which projects externally of said edge.

* * * * *